(12) United States Patent
Maeda

(10) Patent No.: US 7,061,640 B1
(45) Date of Patent: Jun. 13, 2006

(54) IMAGE PROCESSING APPARATUS THAT COMPRESSES AND DIVIDES IMAGE DATA FOR STORAGE

(75) Inventor: Hiroshi Maeda, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/506,210

(22) Filed: Feb. 17, 2000

(30) Foreign Application Priority Data

Feb. 18, 1999 (JP) ............................... 11-040649

(51) Int. Cl.
G06F 15/00 (2006.01)
B41J 5/44 (2006.01)

(52) U.S. Cl. .................... 358/1.17; 358/1.16; 382/232

(58) Field of Classification Search ............... 358/1.13, 358/1.15–1.17; 382/232–260
See application file for complete search history.

(56) References Cited

U.S. PATENT DOCUMENTS

| 5,220,440 | A | * | 6/1993 | Hisatake ..................... 382/239 |
| 5,611,024 | A | * | 3/1997 | Campbell et al. ........... 358/1.15 |
| 5,703,967 | A | * | 12/1997 | Takaoka ...................... 382/282 |
| 5,841,547 | A | * | 11/1998 | Takemoto et al. .......... 358/296 |
| 5,963,968 | A | * | 10/1999 | Warmus et al. ............. 715/517 |
| 5,991,515 | A | * | 11/1999 | Fall et al. ................... 358/1.15 |

FOREIGN PATENT DOCUMENTS

| JP | 4-88571 | 3/1992 |
| JP | 04-088749 | 3/1992 |
| JP | 04088571 A * | 3/1992 |
| JP | 04-215189 | 8/1992 |
| JP | 7-9710 | 1/1995 |
| JP | 7-321975 | 12/1995 |
| JP | 8-142418 | 6/1996 |
| JP | 8-272553 | 10/1996 |
| JP | 08-331369 | 12/1996 |
| JP | 09-136456 | 5/1997 |
| JP | 10-224579 | 8/1998 |
| JP | 11-024651 | 1/1999 |

* cited by examiner

Primary Examiner—King Y. Poon
(74) Attorney, Agent, or Firm—David G. Conlin; William J. Daley, Jr.; Edwards, Angell, Palmer & Dodge LLP

(57) ABSTRACT

Conventionally, although a technique has been proposed in which image data is compressed and divided so as to be stored in a storing means, no device has been made as to a process which temporarily restores a group of divided and compressed image data and then again compresses and divides the data so as to be stored in the storing means. In contrast, the central processing unit of the present invention is designed so that, when, after the group of the divided and compressed image data, which were divided and temporarily stored in the storing means, have been restored and subjected to the image processing, the resulting data is again compressed and divided so as to be stored in the storing memory, a storing area used by the group of the divided and compressed image data prior to the image processing can also be used, if there are not enough empty areas; thus, it is possible to effectively avoid interruptions to the process due to insufficient empty areas.

13 Claims, 15 Drawing Sheets

FIG. 7

BLOCK MANAGING TABLE: 701

| BLOCK No. | EMPTY STATE |
|---|---|
| 1 | 0 |
| 2 | 1 |
| 3 | 0 |
| 4 | 1 |
| 5 | 1 |
| 6 | 0 |
| 7 | 1 |
| 8 | 1 |
| 9 | 1 |
| ⋮ | ⋮ |

\* 0: DATA PRESENT
  1: NO DATA

FIG. 9

BLOCK MANAGING TABLE: 702

| BLOCK No. | EMPTY STATE | CONTINUITY |
|---|---|---|
| 1 | 0 | 0 |
| 2 | 1 | 1 |
| 3 | 0 | 0 |
| 4 | 1 | 2 |
| 5 | 1 | — |
| 6 | 0 | 0 |
| 7 | 1 | 6 |
| 8 | 1 | — |
| 9 | 1 | — |
| ⋮ | ⋮ | ⋮ |

\* EMPTY STATE   0: DATA PRESENT
                         1: NO DATA
  CONTINUITY    NUMBER OF CONTINUOUS EMPTY BLOCKS

FIG. 11
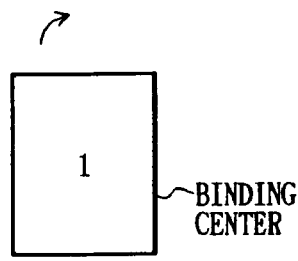
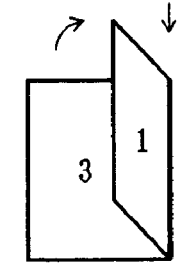
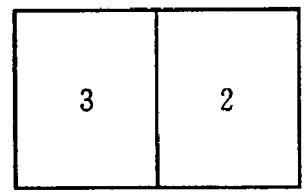
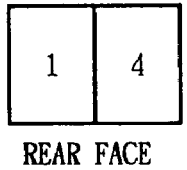
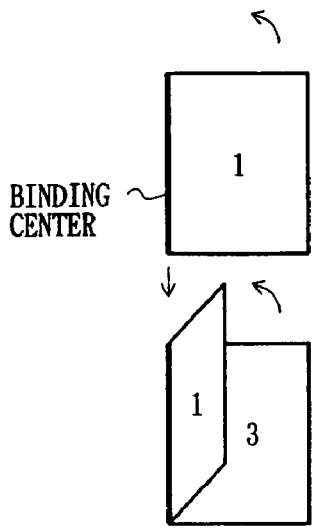
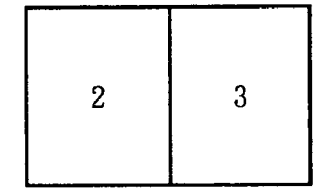
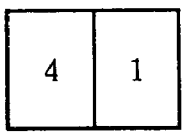
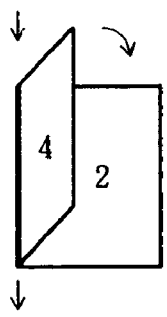
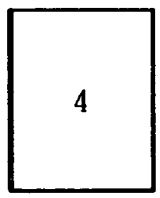
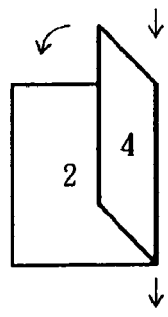
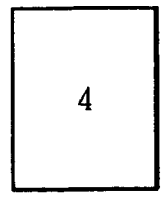

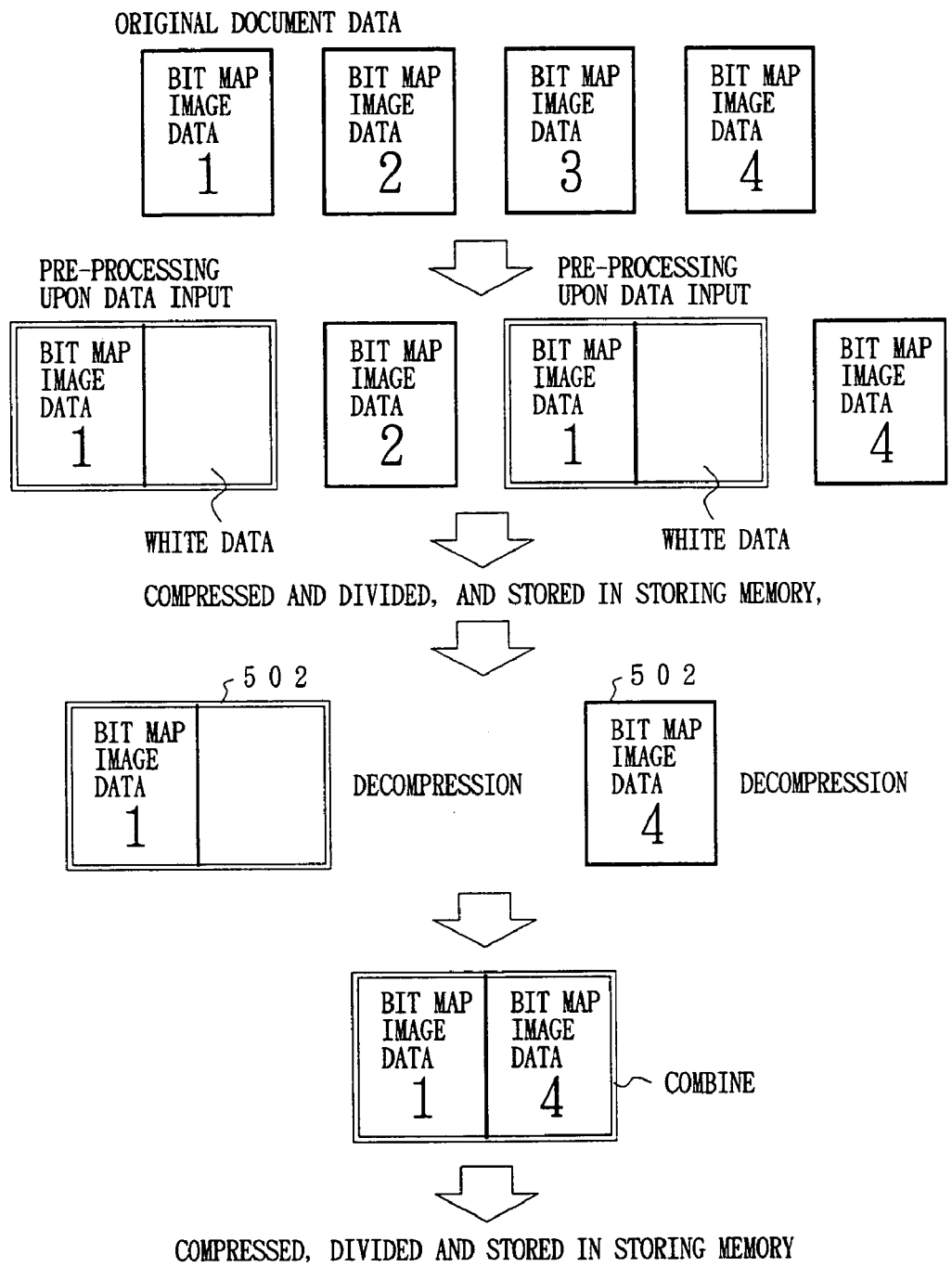

IMAGE PROCESSING APPARATUS THAT COMPRESSES AND DIVIDES IMAGE DATA FOR STORAGE

FIELD OF THE INVENTION

The present invention relates to an image-processing apparatus which can compress and divide image data so as to store it in a storing means.

BACKGROUND OF THE INVENTION

Conventionally, an image-processing apparatus has been known in which a means for dividing and compressing image data, a means for storing a group of image data that have been compressed and divided, and a means for restoring the image data by combining and decompressing the group of divided and compressed image data that have been stored in the storing means are installed.

For example, Japanese Laid-Open Patent Application No. 272553/1996 (Tokukaihei 8-272553, published on Oct. 18, 1996) has disclosed an image-processing apparatus wherein: a data memory having unit-based storing area in which one page is divided into P×Q sections with one unit consisting of an M×N matrix area, a compression processing means for storing a bit map image in the storing areas corresponding to the units while storing its pointer in a map memory so as to compress and store the bit map image and a decompressing means for decompressing and outputting the bit map memory in the data memory through the pointer in the map memory are installed so that the bit map image is overwritten on the data memory.

Moreover, Japanese Laid-Open Patent Application No. 142418/1996 (Tokukaihei 8-142418, published on Jun. 4, 1996) has disclosed a printer control device in which: a microcomputer divides print information into a plurality of area, develops each piece of information contained in the divided area so as to store it in a memory, compresses image data that has been held, and stores the compressed image data in the memory, so that decompressed image data is printed.

Here, in digital copying machines, etc. equipped with a storing means which can compress and divide image data corresponding to, for example, a plurality of sheets of original documents, and store the data, the following image processing is required: that is, image data corresponding to a plurality of sheets of original documents are read, and temporarily stored in a storing area of a storing means after having been compressed and divided, and various editing processes specified by the user, such as an "N in 1 editing process" for outputting image data corresponding to N pages (N sheets of original documents) onto one sheet of paper, a "center binding editing process" in which every two pages of a plurality of sheets of original documents are printed on two sides of paper so as to form a book-like shape by binding the center portion thereof, and a "slanted letter" editing process for forming slanted letters, are then carried out.

In such a case, the following processes have to be carried out: the group of divided and compressed image data are combined, decompressed and restored into the original image data on an area other than the above-mentioned storing area or on another storing means (work memory) and these data are subjected to predetermined image processes, and then again stored in the storing area of the storing means after having been compressed and divided.

However, in the above-mentioned Laid-Open Patent Applications, although the descriptions show methods for compressing and dividing image data and for storing it in the storing means, no description is given to the process in which the group of divided and compressed image data are temporarily restored, and then again stored in the storing area of the storing means after having been compressed and divided. For this reason, the following problems are raised:

1) It is considered that normally the group of divided and compressed image data is maintained until the specified image processing has been completely finished, that is, until the image data after the image processing has been compressed, divided and then again stored in the storing means, in case of re-try due to an unexpected trouble, etc.

For this reason, empty storing areas in which the image data after the image processing has been compressed, divided and then stored tend to become insufficient, resulting in interruptions in the image processing.

2) In the case when the divided and compressed image data, temporarily stored in the storing means, are read and subjected to an image-processing including an image combining process such as a center-binding editing process and an editing process for collecting images corresponding to a plurality of pages to one page, the group of divided and compressed image data of respective pages to be combined are joined and decompressed into a processable state on a work memory, and then combined.

Consequently, for example, in the case of a process for collecting images of two pages into one page, the work memory corresponding to a total of four pages is required for the reading process for the respective pages and for the image combining process, with the result that the greater the number of images (the number of pages) to be combined, the greater the work memory required.

SUMMARY OF THE INVENTION

The present invention relates to an image-processing apparatus which can compress and divide image data so as to store it in a memory means, and its first objective is to provide an image-processing apparatus which is less susceptible to errors in image processing due to insufficient empty storing areas in a storing means (storing section) for storing the group of divided and compressed image data and which is thus capable of processing images more efficiently. With respect to the image-processing apparatus which can compress and divide image data so as to store it in a memory means (storing section), the second objective of the present invention is to provide an image-processing apparatus which requires less work memory in carrying out an image processing and which can carry out the image processing more easily at high speeds.

In order to achieve the above-mentioned objectives, an image-processing apparatus of the present invention is provided with: a storing section having a storing area for storing image data that has been compressed and divided; and an image-processing control section which combines and decompresses stored image data in the storing section, and then carries out an image processing on the image data, and which again stores the processed image data that has been compressed and divided in the storing section, the image-processing control section having a judgment section which makes a judgment as to whether or not an empty storing area in the storing section is sufficient in storing the processed image data, upon judgement by the judgment section showing that the empty storing area is insufficient, the image-processing control section allowing the processed image data to be stored in storing areas including the storing areas in which the stored image data was originally stored.

In the above-mentioned arrangement, the compressed and divided image data is stored in the storing area in the storing section. In the case when an image processing is carried out on the stored image data that has been temporarily stored, the image-processing control section combines and decompresses the stored image data and the image processing is carried out on the resulting image data. The processed image data, which has been subjected to the imaging process, is compressed and divided, and then stored in the storing section.

Here, in conventional image-processing apparatuses, when image data after having been subjected to an image processing is stored in the storing section, the image data prior to the image processing, as it is, is maintained in the storing section in its stored state; this tends to cause insufficient empty storing areas in the storing section, resulting in interruptions in the process. However, the conventional image-processing apparatuses have failed to prepare a device for avoiding such interruptions.

In contrast, in accordance with the above-mentioned invention, the image-processing control section has a judgment section which makes a judgment as to whether or not an empty storing area in the storing section is sufficient in storing the processed image data. Moreover, if the judgment section shows that it is insufficient, the image-processing control section allows the processed image data to be stored in storing areas including the storing section.

In other words, the judgment section makes the judgment as to whether or not there is a sufficient empty storing area in the storing section required for storing the processed image data in the storing section. As a result, in the case of an insufficient empty storing area, the storing area used by the stored image data in the storing section, that is, the image data prior to the image processing, is utilized. This makes it possible to compensate for the insufficiency in the empty storing area, and consequently to store more processed image data in the storing section. Thus, it becomes possible to prevent interruptions due to the insufficient empty area.

In order to solve the above-mentioned objectives, another image-processing apparatus is provided with: a storing section having a storing area for storing image data that has been compressed and divided; and an image-processing control section which carries out a pre-processing on image data, compresses and divides the image data, and then stores the resulting image data in the storing section as stored image data, which combines and decompresses the stored image data, and then carries out an image processing on the image data, and which again stores the processed image data that has been compressed and divided in the storing section, the image processing including a combining process for main image data and sub image data of the image data, the pre-processing including a process for adding to the main image data a blank section to which the sub image data is inserted.

In accordance with the above-mentioned arrangement, with respect to the stored image data temporarily stored in the storing section, an image processing including a combining process for main image data and sub image data is carried out, the image-processing control section carries out the following pre-processing: that is, in the pre-processing, a blank section to which the sub image data is inserted is added to the main image data.

Consequently, since the image processing is completed merely by inserting the sub image data to the blank section of the main image data, it is possible to carry out the image processing at high speeds by using less image processing area, that is, less work memory. Moreover, even in the case when the image data added by the blank section is stored in the storing section, since the blank section can be highly compressed, it is possible to carry out the above-mentioned high-speed image processing without causing the problem of high consumption of the storing area.

For a fuller understanding of the nature and advantages of the invention, reference should be made to the ensuing detailed description taken in conjunction with the accompanying drawings.

BRIEF DESCRIPTION OF THE DRAWINGS

FIG. 7 is an explanatory drawing that shows one example of a block management table used for managing the empty status of storing areas in a storing memory.

FIG. 9 is an explanatory drawing that shows another example of a block management table used for managing the empty status of storing areas in the storing memory.

FIG. 11 is an explanatory drawing that shows "an editing process for center binding".

FIG. 15 is an explanatory drawing that shows another sequence of processes in which page 1 and page 4 have been combined in "the editing process for center binding (right binding)."

DESCRIPTION OF THE EMBODIMENTS

Referring to FIGS. 1 through 15, the following description will discuss one embodiment of the present invention.

Figure 2:
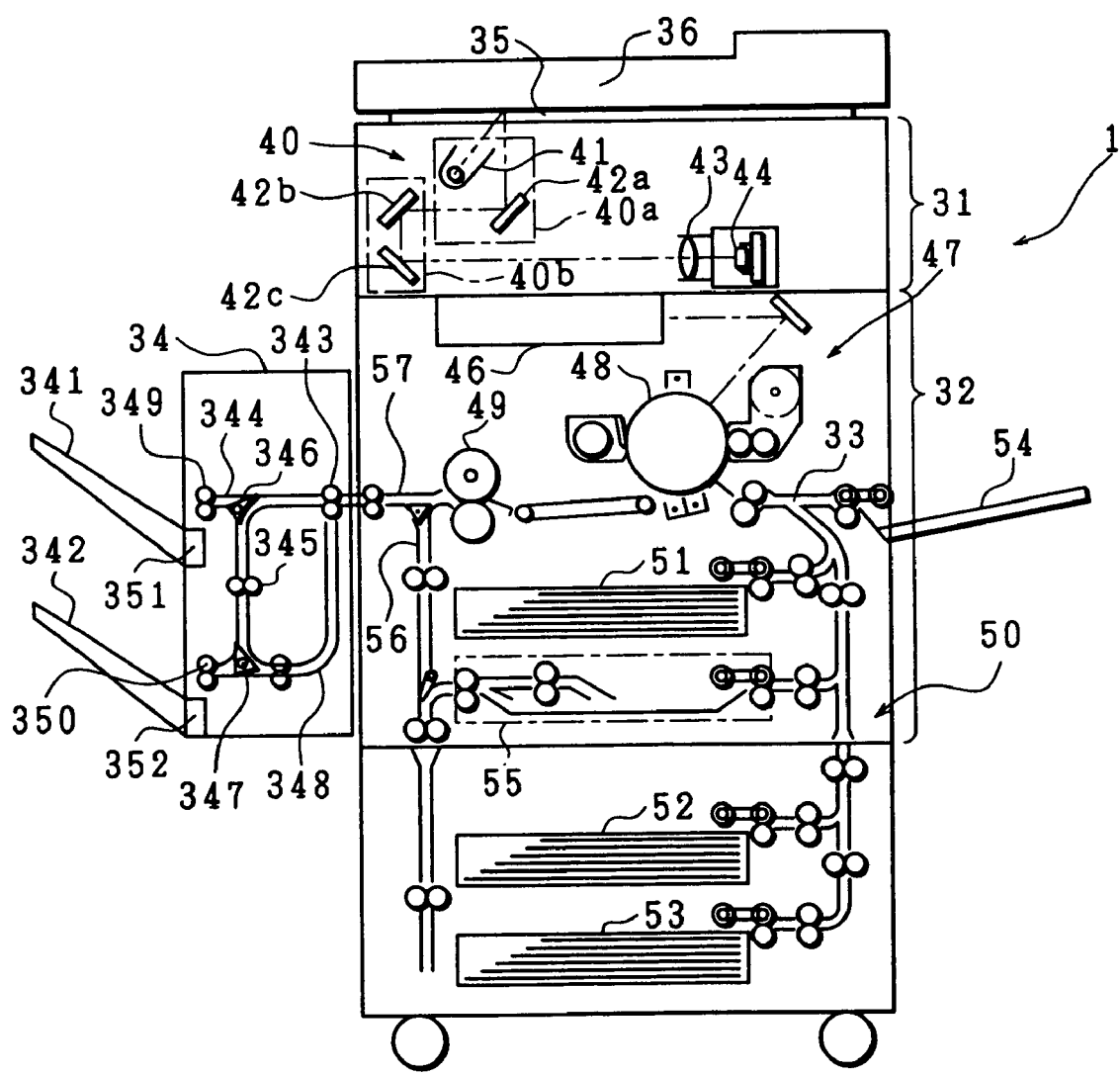
FIG. 2 is a schematic drawing that shows the structure of the digital copying machine.

FIG. 2 is a cross-sectional view that shows the structure of a digital copying machine 1 in which the arrangement of an image-processing apparatus in accordance with the present invention is adopted. As illustrated in FIG. 2, the digital copying machine 1 is mainly constituted by a scanner section 31 and a laser recording section 32.

The scanner section 31 is constituted by a document platen 35 made of transparent glass, a recirculating automatic document feeder (RADF) 36 for automatically feeding and supplying documents onto the document platen 35, and a document image reading unit, that is, a scanner unit 40, for scanning and reading the image of a document placed on the document platen 35.

The document image read by the scanner section 31 is sent to an image-processing section shown in FIG. 4, which will be described later, as image data, and the image data is subjected to predetermined image processes.

A plurality of sheets of documents are set on a predetermined document tray as one lot and the RADF 36 automatically feeds the stacked documents sheet by sheet to the document platen 35 of the scanner section 31. The RADF 36 is constituted by a transport path for one-sided documents, a transport path for two-sided documents and a means for switching the transport paths so as to allow the scanner unit 40 to read one side or two sides of documents in response to the operator's selection. Here, with respect to the RADF 36, since many patent applications have been conventionally filed and since many of those devices have been commercialized, the further description thereof is omitted.

The scanner unit 40 is constituted by a lamp reflector assembly 41 for exposing the surface of a document, a first scanning unit 40a constituted by a first reflection mirror 42a for directing a reflected light image from the document to a photoelectric conversion element 44, a second scanning unit 40b constituted by second and third reflection mirrors 42b and 42c for directing reflected light images from succeeding documents to the photoelectric conversion element 44, an optical lens body 43 for converging the image on the photoelectric conversion element 44 for converging a reflected light image from the document into an electrical image signal, and the photoelectric conversion element 44, such as CCDs, for converging a reflected light image from the document into an electrical image signal.

The scanner section 31 allows the scanner unit 40 to move along the rear face of the document platen 35 so as to read the document image, while successively feeding documents to be read onto the document platen 35, through associated operations between the RADF 36 and the scanner unit 40.

The image data, obtained by reading the document image using the scanner unit 40, is subjected to various image processes in the image-processing section shown in FIG. 4, and then sent to a laser writing unit (hereinafter, referred to as LSU) 46 in a laser recording section 32.

The laser recording section 32 is provided with a paper-housing and transporting section, an LSU 46 and an electrophotographic process section 47 for forming images.

The paper-housing and transporting section is provided with a first cassette 51, a second cassette 52, a third cassette 53, and a multi-manual insertion tray 54, and it also has a double-sided copying unit 55 for recording images on the rear face of copy paper bearing an image.

Sheets of paper are housed in respective cassettes for respective sizes in the paper-housing and transporting section, and when the operator selects a cassette housing paper of his or her desired size, sheets of paper are fed sheet by sheet from the uppermost sheet of the stacked paper inside the cassette by a paper transporting section 50, and this is transported to the electrophotographic process section 47 of the laser recording section 32 after having successively passed through the transport path 33.

The LSU 46 is provided with a semiconductor laser for releasing a laser beam representative of image data from the above-mentioned memory, a polygon mirror for deflecting the laser beam with a constant angular velocity, a fθ lens for correcting the laser beam that has been deflected with the constant angular velocity so as to be deflected with a constant angular velocity on a photoreceptor drum 48 in the electrophotographic process section 47, etc.

The electrophotographic process section 47, which is designed in a widely known mode, is provided with a charger, a developing device, a transfer device, a separation device, a cleaning device and a static eliminating device that are arranged on the periphery of the photoreceptor drum 48, and also includes a fixing device 49 that is placed on the downstream side in the paper transport direction of these devices.

Moreover, a paper discharging transport path is placed on the further downstream side in the paper transport direction from the fixing device 49, and the paper discharging transport path is branched into a transport path 57 connecting to a postprocessing device 34 and a transport path 56 connecting to the double-sided copying unit 55.

Image data, read from the image memory, is formed on the surface of the photoreceptor drum 48 as an electrostatic latent image by a scanning process carried out by the LSU 46 using a laser beam, and a toner image which has been visualized by toner is electrostatically transferred onto the surface of a sheet of paper transported from the paper-housing and transporting section, and fixed thereon.

The sheet of paper bearing the image formed thereon is selectively sent from the fixing device 49 to the post-processing section 34 through the transport path 57, or to the double-sided copying unit 55 through the transport path 56.

The post-processing device 34 is provided with a first paper-discharge tray 341 and a second paper-discharge tray 342 that are placed longitudinally in an overlapped manner on the left side of the device, and receives sheets of paper bearing images from the transport path 57 on the digital copying machine 1 side. Inside the post-processing device 34 are installed a paper-receiving inlet 343, a first transport path 344, a second transport path 345, a first switching gate 346, a second switching gate 347, a switching-back transport path 348, a first discharge roller 349, a second discharge roller 350, etc. so as to deal with various discharging modes.

In the first discharging mode, sheets of paper received by the paper-receiving inlet 343 are discharged on the first paper-discharge tray 341 directly by the first discharge-roller 349 from the first transport path 344. In this case, the sheets of paper are discharged with their faces up, that is, with their recording faces up.

In the second discharging mode, sheets of paper received by the paper-receiving inlet 343 are directed to the second transport path 345 by the first switching gate 346, and then guided to the second discharge roller 350 side by the second switching gate 347 so that they are discharged onto the second paper-discharge tray 342 with their faces up from the second discharge roller 350.

In the third discharging mode, sheets of paper received by the paper-receiving inlet 343 are directed to the second transport path 345 by the first switching gate 346, and then guided to the switching-back transport path 348 by the second switching gate 347. Here, when the rear end of the sheet of paper has passed through the second switching gate 347, the sheet of paper is subjected to a switching-back transport operation so that it is guided from the second switching gate 347 to the second discharge roller 350 side, and discharged onto the second paper-discharge tray 342 from the second discharge roller 350. In this case, having been subjected to the switching-back transport operation, the sheet of paper is discharged with its recording face down.

Moreover, the first paper-discharge tray 341 and the second paper-discharge tray 342 are provided with conventionally known offset mechanisms 351 and 352 so as to orient the accommodation state of the sheets of paper to be accommodated and discharged in a direction virtually orthogonal to the discharging direction; thus, it is possible to classify and accommodate the sheets of paper bearing images for each unit of jobs or for each mode.

Figure 3:
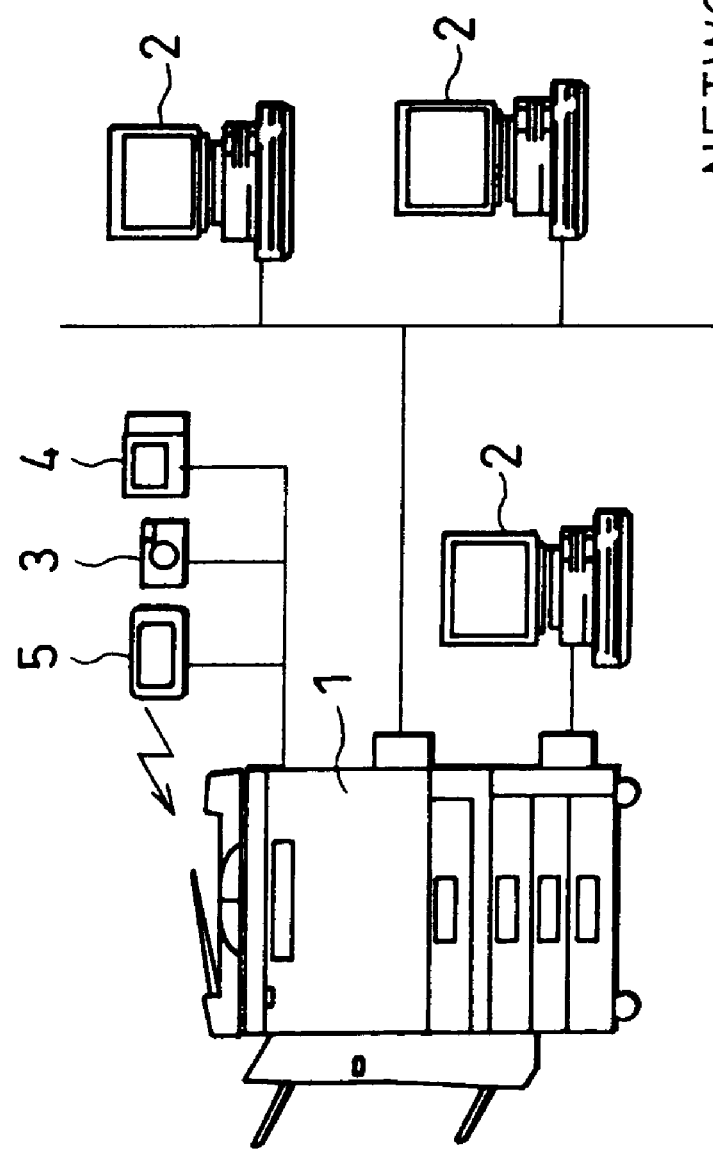
FIG. 3 is an explanatory drawing that shows a network environment to which the digital copying machine is connected.

FIG. 3 is an explanatory drawing that shows a network environment in which this digital copying machine 1 is connected to a personal computer 2, a digital camera 3, a digital video camera 4, a portable terminal apparatus 5, etc. that are other image-processing apparatuses.

Image data, transferred to the digital copying machine 1 from any one of the image processing apparatuses thus network-connected, is temporarily sent to the image processing section of the digital copying machine 1, where it is subjected to predetermined processes, and then, outputted from the laser recording section 32 shown in FIG. 2, and reproduced as an image.

Next, an explanation will be given of the construction and functions of the image processing section for carrying out image processes on document image information that has been acquired in this digital copying machine 1.

Figure 4:
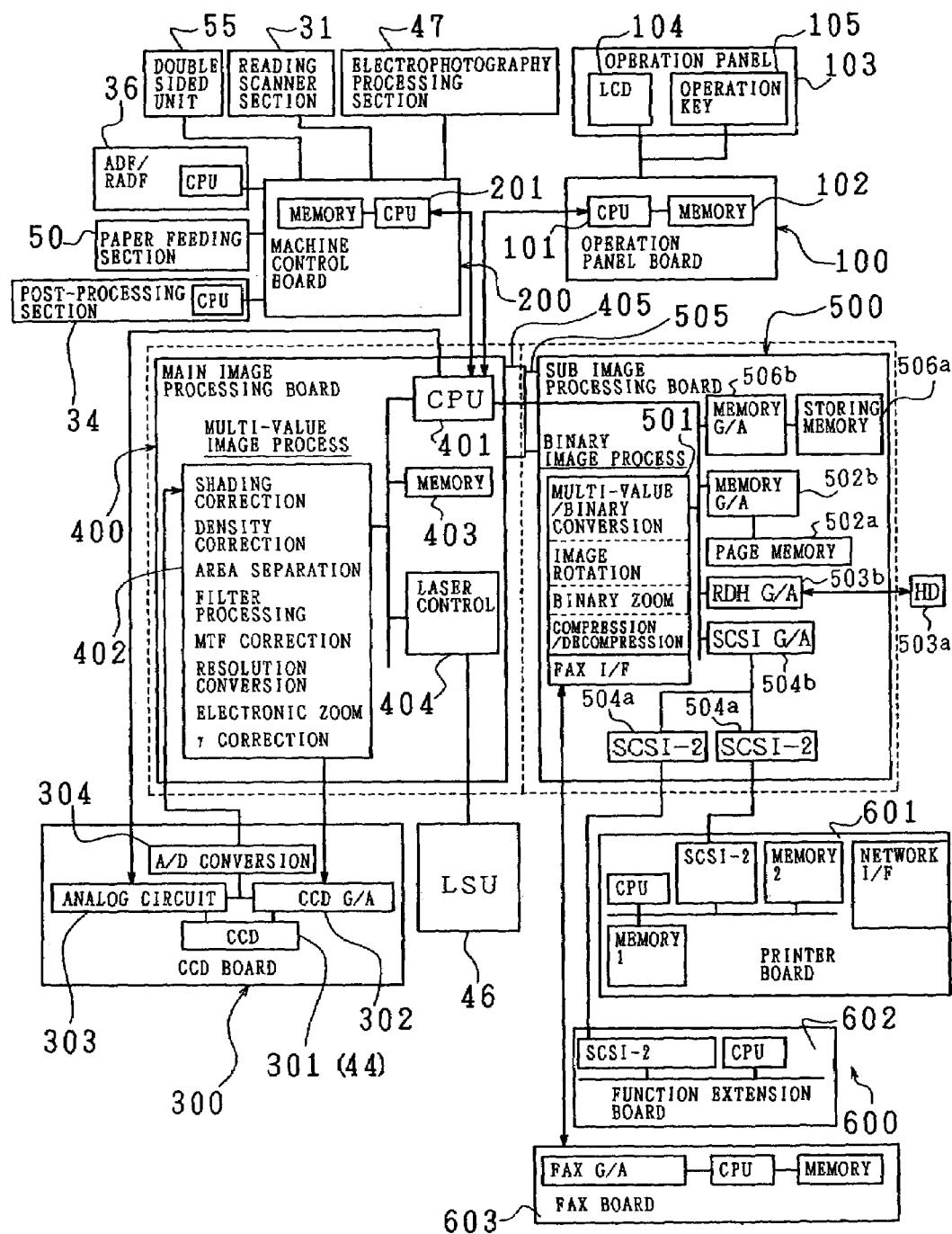
FIG. 4 is an explanatory drawing that shows the structure of an image-processing section of the digital copying machine.

FIG. 4 is a block diagram that shows the entire structure of various unit sections, image processing sections, etc. that constitute the digital copying machine 1 of FIG. 2; and this Figure shows a state in which a main central processing unit 401 (CPU), located in the center, carries out controlling operations in cooperation with sub central processing units (CPU) installed in the respective units.

As illustrated in the Figure, this system is constituted by an operation panel board 100 for mainly controlling and managing an operation panel 103, a machine control board 200 for controlling and managing the respective units constituting the digital copying machine 1, a CCD board 300 for electrically reading a document image so as to form electronic data (image data), a main image-processing board 400 for carrying out a predetermined image processing on the document image that has been formed into electronic data by the CCD board 300, a sub image-processing board 500 for further carrying out a predetermined image processing on the image data that has been processed by the main image-processing board 400, and a group of other extension boards 600 (printer boards, FAX boards, function extension boards, etc.) that are connected to the sub image-processing board 500 through the interface.

The following description will discuss the contents of the managing and controlling operations for each of the boards.

The operation panel board 100, which is basically controlled by the sub central processing unit (CPU) 101, carries out managements on operational inputs, etc. from a display screen of the LCD display section 104 arranged on the operation panel 103 and a group of operation keys 105 consisting of a start key, a clear key, ten keys, etc. The operation panel board 100 is also provided with a memory 102 for storing various pieces of control information in the operation panel 103, such as data inputted from the LCD display section 104 and the group of operation keys 105 and information to be displayed on the LCD display section 104.

In this arrangement, the sub central processing unit 101 carries out control data communication with the main central processing unit 401, and gives operation instructions to the digital copying machine 1. Moreover, a control signal that shows the operational state of the digital copying machine 1 is transferred from main central processing unit 401 to the sub central processing unit 101 so as to display the current status of the apparatus for the user, through the LCD display section 104 of the operation panel 103.

The machine control board 200, which is controlled as a whole by the sub central processing unit 201, is allowed to manage devices, such as the automatic document feeder such as the above-mentioned RADF 36, the scanner section 31 for reading a document image, the electrophotographic process section 47 for reproducing the image data as an image, a paper-feeding and transporting section 50 for supplying image-recording paper from a cassette, etc. and for successively transporting the paper toward the electrophotographic process section 47, the double-sided copying unit 55 for transporting the paper in a reversed manner so as to form images on both faces of the paper, and the post processing device 34 for carrying out post-processes such as a stapling process on the paper bearing a recorded image.

The CCD board 300, which is managed and controlled by the main central processing unit 401, is constituted by a CCD 301 for electrically reading a document image, a circuit (CCD gate array) 302 for driving the CCD 301, an analog circuit 303 for carrying out a gain adjustment, etc. on analog data released from the CCD 301, and an A/D converter 304 for converting the analog output from the CCD 301 into a digital signal so as to output it as electronic data.

The main image-processing board 400, which is controlled by the main central processing unit 401, is constituted by: a multi-value image processing section 402 which, in order to display an image with a desired gradation state based upon the electronic data of the document image sent from the CCD board 300, carries out various processes by using the multi-value image data as it is, such as, a shading correction process, a density correction process (a region separation process, a filtering process) an MTF correction process, a resolution converting process, an electronic zooming process (variable magnification process) and a gamma correction process; a memory 403 for storing image data having been subjected to the processes or various pieces of control information, such as managements on sequences of processes, and a laser control 404 for transferring and controlling data toward the LSU 46 side for reproducing an image by using the image information that has been subjected to the processes.

The sub image-processing board 500 is constituted by: binary image-processing section 501 which is connected to the main image-processing board 400 through a connector and which is controlled by the main central processing unit 401 on the main image-processing board 400; a storing memory 506a (storing means) for storing the image data in a divided manner; a page memory 502a which serves as a work memory (image-processing area) for temporarily storing the image data so as to compress it, for decompressing and restoring compressed image data read out from the storing memory 506a, and for subjecting the image data to image-processing operations; an SCSI 504a serving as an external interface; and gate arrays 506b, 502b and 504b for respectively controlling the storing memory 506a, the page memory 502a and SCSI 504a.

Moreover, as described earlier, since the present digital copying machine 1 is a composite machine having printer and facsimile functions, it is provided with a hard disk 503*a* as an extension device so as to efficiently store input data received in the facsimile mode and the printer mode. The hard disk 503*a* is controlled by a gate array 503*b*.

The binary image processing section 501 is constituted by a multi/binary value conversion section for converting multi-value image information into binary image, an image rotation section for rotating an image, a binary variable magnification (zoom) section for carrying out a variable magnification process on a binary image, a compression/decompression section for compressing and decompressing binary data, and is further provided with a facsimile interface so as to transmit and receive a facsimile image through a communication means.

The group of extension boards 600 includes a printer board 601 for allowing data sent from a personal computer externally connected to be outputted from the laser recording section 32 of the digital copying machine 1 in a printer mode, a function extension board 602 for effectively utilizing the features of the digital copying machine 1 by extending the editing functions of the digital copying machine 1, and a facsimile board 603 for transmitting a document image read by the scanner section 31 of the digital copying machine 1 to the other party, or for enabling image information sent from the other party to be outputted from the laser recording section 32 of the digital copying machine.

Here, an explanation will be given of basic image data processings of the sequences thereof in the copying mode, facsimile mode and printer mode in the above-mentioned digital copying machine 1.

(1) Normal Copying Mode

Documents, set on a predetermined position of the RADF 36 in the digital copying machine, are successively supplied onto the document platen 35 of the scanner unit 31 sheet by sheet so that images of the documents are successively read by the scanner unit 40 having the arrangement as described earlier; thus, the images are transferred to the main image-processing board 400 as 8-bit electronic data.

The 8-bit electronic data, transferred to the main image-processing board 400, is subjected to predetermined processes on the multi-value image processing section 402 as 8-bit electronic image data. Then, after having been subjected to processes such as a gamma correction process, the 8-bit electronic data is transmitted to the LSU 46 through the laser control 404.

Thus, the document image read by the scanner section 31 of the digital copying machine 1 is outputted from the laser recording section 32 as a copied image with predetermined gradations.

(2) Application of the Electronic RDH (Recycle Document Handler) Function in the Copying Mode Documents, set on a predetermined position of the RADF 36 in the digital copying machine, are successively supplied onto the document platen 35 of the scanner unit 31 sheet by sheet so that images of the documents are successively read by the scanner unit 40 having the arrangement as described earlier; thus, the images are transferred to the main image-processing board 400 as 8-bit electronic data. The 8-bit electronic data, transferred to the main image-processing board 400, is subjected to predetermined processes on the multi-value image processing section 402 as 8-bit electronic image data (the same as image data).

The 8-bit image data is then transmitted to the sub image-processing board 500 side from the connector 405 on the main image-processing board 400 side through the connector 505 on the sub image processing board 500 side; thus, this is subjected to an error dispersion process, etc. and converted from the 8-bit image data to 1-bit image data in the multi/binary value conversion section of the binary image processing section 501.

Here, the reason that the 8-bit image data is converted into 1-bit image data including the process such as the error dispersion process is because the application of only the multi/binary value conversion would raise a problem of degradation in image quality and because provision is made to reduce the degradation in image quality. Moreover, the reason that the 8-bit image data is converted to 1-bit image data is because consideration is given to the storage capacity for the image.

The 1-bit image data thus converted is further compressed from the binary data in a compression/decompression section in the binary image processing section 501. The compression/decompression section compresses the image data in a predetermined format so that compressed image data is formed on the page memory 502*a*. The compressed image data, thus formed on the page memory 502*a*, is transferred to the storing memory 506*a* for storing compressed image data, in which it is temporarily stored and maintained. These compressing process of the image data on the page memory 502*a* and storing process in the storing memory 506*a* are carried out for each sheet (one page) of the documents. Here, with respect to a method for managing the storing process of the compressed image data into the storing memory 506*a* will be described later in detail.

When all the group of documents set on the RADF 36 of the digital copying machine 1 have been read and processed, the compressed image data, which has been divided and temporarily stored in the storing memory 506*a*, is repeatedly read out by the number of copies specified by the control of the gate array 506*b*, extended on the page memory 502*a* so that it is restored to the original 1-bit electronic image data, again sent to the main image-processing board 400 through the connectors 405 and 505, and after having been subjected to processes such as a gamma correction, sent to the LSU 46 through the laser control 404.

With this arrangement, the document image read by the scanner 31 of the digital copying machine 1 is outputted from the laser recording section 32 as a copied image with predetermined gradations.

Here, the present embodiment has exemplified a case in which after all the group of the document images have been read, the group of the images are repeatedly read out by the number of desired copies; however, another arrangement may be used in which the output of the first set of images is automatically made immediately after the corresponding set of images have been ready.

(3) Printer Mode

An image, which has been sent from an external apparatus that is network-connected through the network, is developed on the printer board 601 through the network interface on the printer board 601 as an image for each page unit, and then temporarily transferred to the sub image-processing board 500 side from the SCSI 504*a* constituting the interface, and stored in a memory such as the hard disk 503*a*.

An explanation will be briefly given of the sequence of these processes by exemplifying image inputs from the personal computer. When text data, etc., drafted on the personal computer, is transferred in a data format of PS (Postscript) or PCL (Printer Control Language), the transferred data is temporarily stored in a buffer (memory 2) on the printer board 601, and developed on the page memory (memory 1) by the CPU by means of a RIP (Raster Image Processor).

Then, the image data, developed on the page memory (memory 1), is transferred to the sub image-processing board 500, and stored in the hard disk 503a. In this case, if the image data, developed and stored on the page memory (memory 1), is not stored in the hard disk 503a due to any issue related to the capacity, this is held in a stand-by state until the hard disk 503a is released.

Here, the image, developed as a page image on the printer board 601, is transferred to the sub image-processing board 500 side; however, the page image is not subjected to a binary image processing, and only temporarily stored in the hard disk 503a. Moreover, in the case when the page image temporarily stored is read out from the hard disk 503a, the page image is not subjected to the binary image processing.

The image information, temporarily stored in the hard disk 503a, is sent to the main image-processing board 400 while being read from the hard disk 503a so as to be arranged in a predetermined page order, and after having been subjected to a gamma correction, an image writing operation is controlled so that the image information is allowed to reproduce an image by the LSU 46 through the laser control 404.

(4) Facsimile Mode

In the facsimile mode, there are processes for transmitting a document to the other party and for receiving a document from the other party. First, an explanation will be given of the transmission of a document to the other party.

Transmittal documents, set on a predetermined position of the RADF 36 in the digital copying machine, are successively supplied onto the document platen 35 of the scanner unit 31 sheet by sheet so that images of the transmittal documents are successively read by the scanner unit 40 having the arrangement as described earlier; thus, the images are transferred to the main image-processing board 400 as 8-bit electronic data.

The 8-bit electronic data, transferred to the main image-processing board 400, is subjected to predetermined processes on the multi-value image processing section 402 as 8-bit electronic image data. The 8-bit image data is next sent to the sub image-processing board 500 side from the connector 405 on the main image-processing board 400 side through the connector 505 on the sub image-processing board 500 side; thus, this is subjected to an error dispersion process, etc. and converted from the 8-bit image data to 1-bit image data in the multi/binary value conversion section of the binary image processing section 501.

Here, the reason that the 8-bit image data is converted into 1-bit image data including the process such as the error dispersion process is because in the same manner as the application of the electronic RDH function in the copying mode, the application of only the multi/binary value conversion would raise a problem of degradation in image quality and because provision is made to reduce degradation in the image quality.

The transmittal documents. thus formed into the binary images, are compressed in a predetermined format in the compression/decompression section of the binary image-processing section 501, and then divided and stored in the storing memory 506a. Thereafter, when a transmittal state is ensured with the other party after transmission procedures have been carried out with the other party, the compressed transmittal document images read from the storing memory 506a are transferred to the facsimile board 603 side, and after having been subjected to necessary processes such as a change in the compression format on the facsimile board 603, are successively transmitted to the other party through the communication line.

Next, an explanation will be given of the process of document images transmitted from the other party. When documents are transmitted from the other party through the communication line, the document images are received from the other party while communication procedures are being carried out on the facsimile board 603, and the received images in a compressed state in a predetermined format is sent from the facsimile interface installed in the binary image-processing section 501 of the sub image-processing board 500 to the binary image-processing section 501, and the document images transmitted as page images are reproduced by a compression/decompression section, etc.

The document images reproduced as images on a page basis are transferred to the main image-processing board 400 side, and after having been subjected to a gamma correction, an image writing operation is controlled so that the image information is allowed to reproduce an image by the LSU 46 through the laser control 404.

As described above, the image-processing section for carrying out predetermined processes on the image information has a divided construction including the main image-processing board 400 for mainly processing document images read by the scanner section 31 and inputted thereto as multi-value image information, and the sub image-processing board 500 for carrying out predetermined processes such as a binary process on the document image information processed as multi-value image information in the main image-processing board 400, and for carrying out predetermined processes on the image information sent from an apparatus connected through the external interface and then transferring it to the multi-value image-processing section 402 (main image-processing board 400) side.

Moreover, the main-processing board 400 includes the laser control 404 for controlling the LSU 46 in its writing process of the image information in order to reproduce the image from the LSU 46 onto the photoreceptor drum 48 of the electrophotographic process section 47. With this arrangement, the document images, read by the scanner section 31 and inputted thereto, can be reproduced as copied images from the lower recording section 32 without impairing features of the images as multi-value images. Here, in the case of high-speed output processes with a large number of documents by the use of electronic RDH functions, etc., the sub image-processing board 500, the hard disk 503a, etc. may be used.

Furthermore, for the limited application to the process, output and facsimile process on the image information from an external apparatus such as a facsimile and a personal computer, the image information can be subjected to appropriate processes such as a binary process for the transmitted document (with features of the document image maintained) in accordance with digital features and functions provided as the digital copying machine 1.

Moreover, by dividing the image-processing section, many kinds of variations (line-ups) of digital copying machines 1 may be provided, and digital copying machines can be placed so as to meet the user's demands, and after installation, the system development can be carried out with ease.

Here, the central processing unit 401, placed on the main image-processing board 400, also manages and controls the sub image-processing board 500 in the above-mentioned arrangement; therefore, in the respective processing sections, the flow of images as a whole to be continuously processed can be managed properly, with the result that a smooth flow of data processings is obtained and it is possible to make the system free from image data loss.

Next, a detailed explanation will be given of an essential portion to which the arrangement of the image-processing apparatus of the present invention is applied, in the present digital copying machine 1.

First, referring to FIGS. 1 and 5, an explanation will be given of a sequences of processes in which image data is compressed and stored in the storing memory 506a in a divided manner as well as a sequence of restoring processes in which compressed image data is read from the storing memory 506a, and combined and decompressed.

Figure 1:
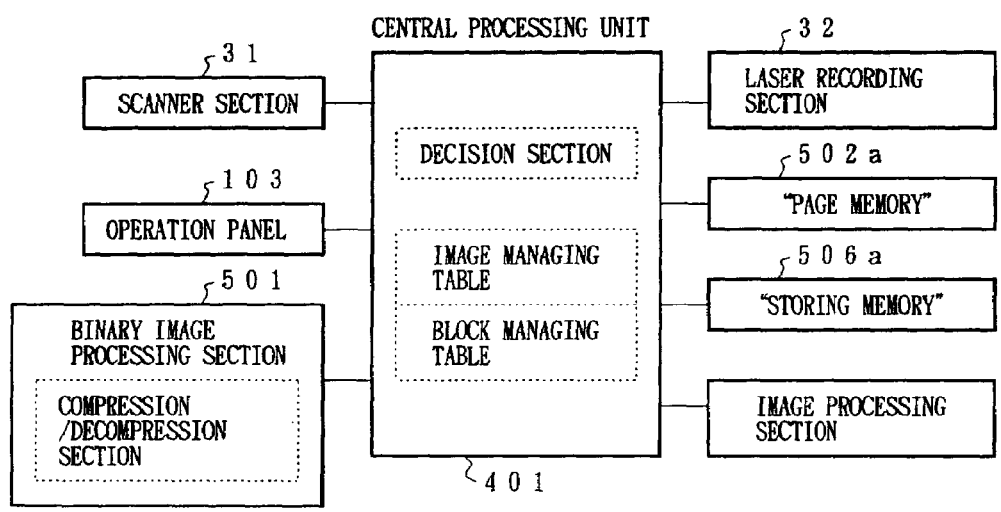
FIG. 1, which shows one embodiment of the present invention, is a block diagram that shows the construction of an essential part of a digital copying machine.
Figure 5:
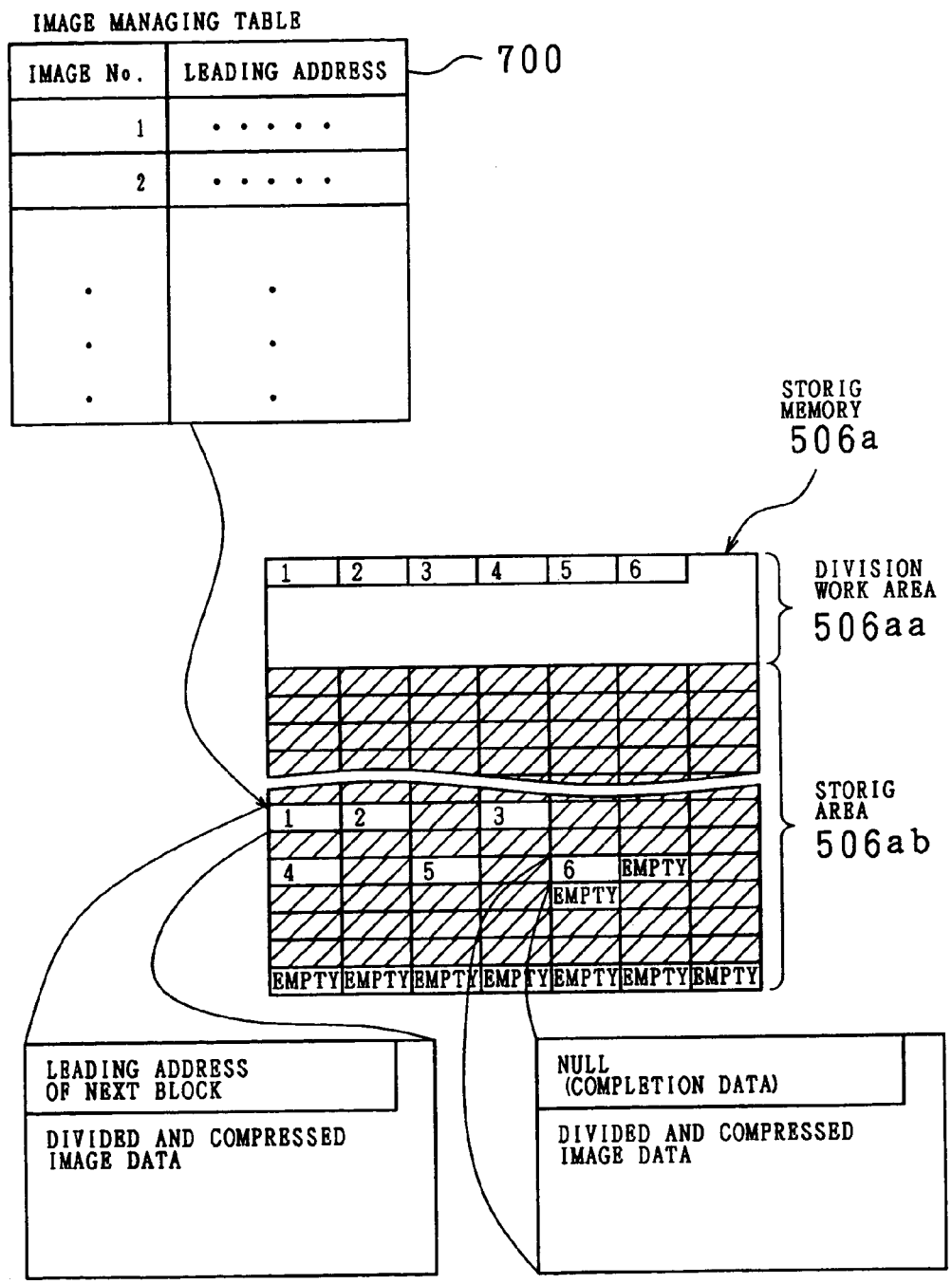
FIG. 5 is an explanatory drawing that shows a method for compressing and dividing image data and for storing the image data in a storing memory.
Figure 6:
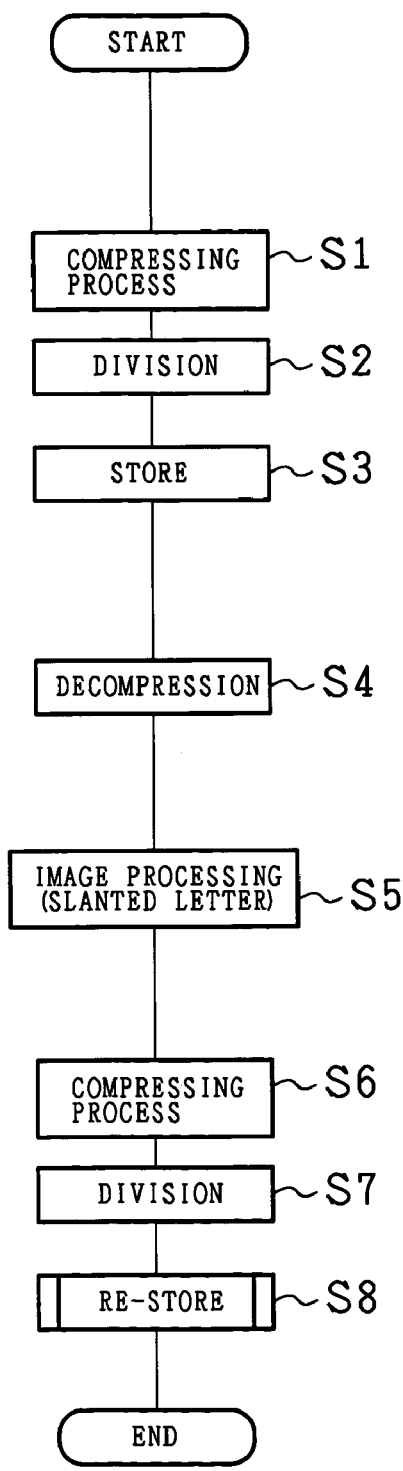
FIGS. 6(*a*) and 6(*b*) are explanatory drawings that show a sequence of processes for carrying out an "italic" image processing together with a state of image data.
Figure 6:
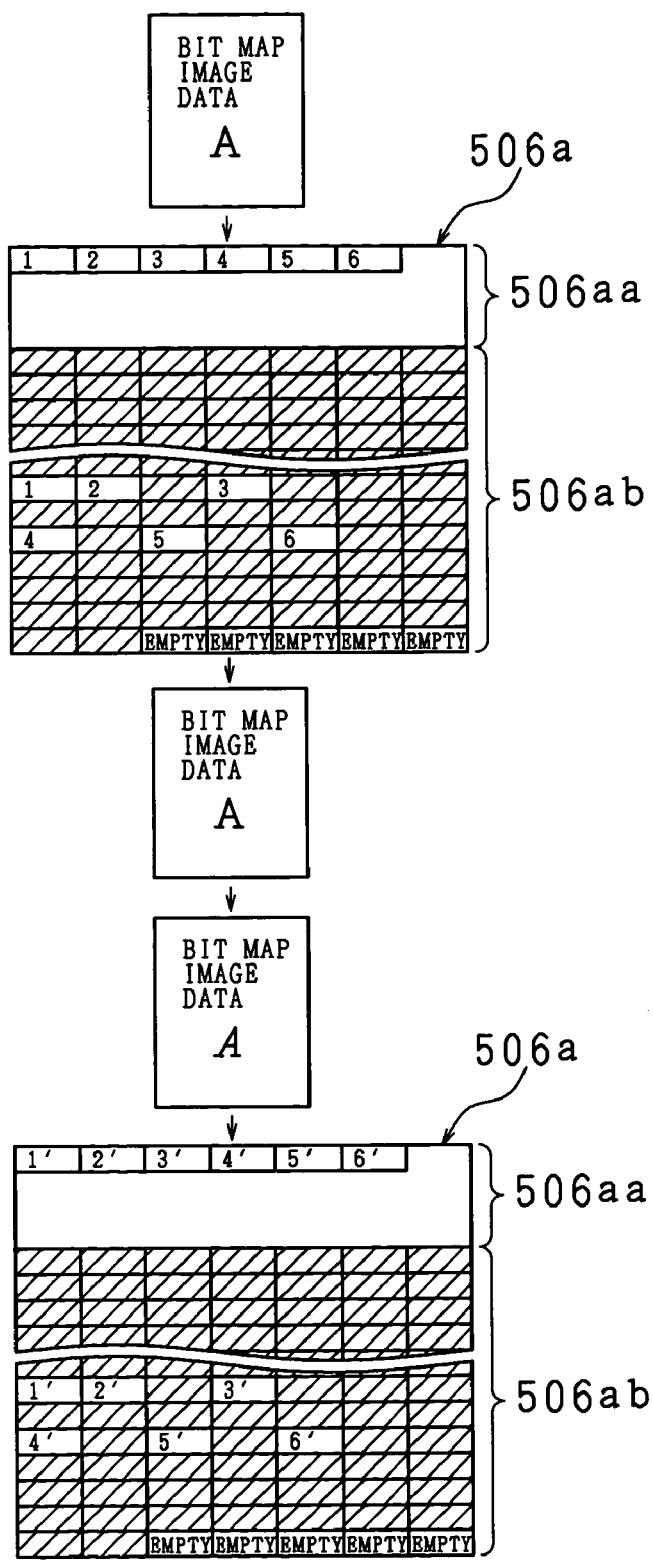

FIG. 1 is a block diagram that shows essential parts of the present digital copying machine to which the arrangement of the image-processing apparatus of the present invention is applied, and FIG. 5 is an explanatory drawing that shows a method for compressing image data and storing it in the storing section 506a in a divided manner.

Image data, inputted to the page memory 502a, is converted from 8-bit data for one pixel to 1-bit data in the multi/binary value conversion section in the binary image-processing section 501. The compressing/decompression section of the binary image-processing section 501 compresses the image data in a predetermined format to convert it into compressed image data in an attempt to further compress the 1-bit image data so as to increase the efficiency of use of the storing memory 506a. Hereinafter, 1-bit image data prior to the compression is referred to as bit map image data.

Under the control of the central processing unit 401 that serves as a storing area managing means (image-processing control section), the compressed image data thus converted is transferred to a division work area 506aa inside the storing memory 506a shown in the center of FIG. 5, where it is divided into predetermined block units. Thereafter, the compressed image data thus divided is transferred to a storing area (memory area) 506ab for dividing and storing the compressed image data within the storing memory 506a for each block (one divided portion) unit.

At the time of this transferring process, the central processing unit 401, while scanning empty areas (empty storing areas) within the storing area 506ab, transfers the divided and compressed image data block by block to empty areas on the basis of block so that the divided and compressed image data of all the blocks are dispersed and stored in the storing area 506ab within the storing memory 506a.

At this time, as illustrated on the upper left-hand side of FIG. 5, in order to clarify the connection between the pieces of divided and compressed image data stored in a dispersed manner, with respect to image data corresponding to one page, the leading address of first one block is registered and managed in an image managing table 700. In the image managing table 700, an image No. corresponding to the page of documents and the leading address of the first block of the corresponding image No. are stored as a pair.

Thereafter, as illustrated on the lower left-hand side of FIG. 5, the leading address of the second block is set to the leading portion of the first block thus stored, and successively, the leading address of the third block is set to the leading portion of the second block. With respect to the final block (the sixth block in the Figure), as illustrated on the lower right-hand side of FIG. 5, the completion data (NULL) indicating the end of the data is set to the leading portion thereof.

In order to acquire desired image data from the storing memory 506a having the image data, the desired image No. is specified in the image managing table 700, and when the image data is selected, the jumping address to the first block is acquired from the paired leading address. Upon reading the first block, the jumping address to the second block set in the leading portion of the first block is acquired; thus, by successively tracking in this manner, the addresses of all the blocks are acquired.

By managing the storing memory 506a in this manner, the central processing unit 401 makes it possible to positively store the compressed image data in the storing memory 506a even when continuous empty blocks are not secured in the storing area 506ab.

Next, an explanation will be given of a case in which, with respect to the group of divided and compressed image data that have been divided and temporarily stored in the compressed data storing area 506ab within the storing memory 506a, an image-processing is carried out.

In the case of a digital copying machine equipped with the storing memory 506a like the present digital copying machine 1, it is required that, after images have been once read, desired image-processings such as various editing processes be carried out. Therefore, it is necessary to deal with the case in which the group of divided and compressed image data, once compressed and stored in the storing memory 506a in a dispersed manner, are combined and decompressed into the original binary image data, and after having been subjected to desired image-processings, these are again compressed and stored in the storing memory 506a.

By exemplifying a "slanted letter" process as an image processing, an explanation will be given of the sequence of processes by reference to FIG. 1 as well as FIGS. 6(a) and 6(b).

FIG. 6(a) is a flow chart showing the sequence of the processes, and on the right side the flow chart, FIG. 6(b) shows changes in the state of the image data.

Image data corresponding to one page of documents, read from the scanner section 31, is binarized in the binary image processing section 501, and temporarily stored in the page memory 502a. The bit map image data, which is image data thus stored, is compressed by the compression/decompression section of the binary image-processing section 501 to form compressed image data (S1). The compressed image data within the page memory 502a is divided and temporarily stored in the division work area 506aa within the storing memory 506a (S2). Thereafter, the pieces of the data are arranged in a dispersed manner in the storing area 506ab within the storing memory 506a while empty areas are being searched for on a basis of predetermined blocks (S3). In this case, when a plurality of sheets of documents are handled, the processes of S1 through S3 are repeated for all the documents.

Upon completion of these processes, in order to carry out an image-processing for a "slanted letter" process specified by using the operation panel 103, the group of divided and compressed image data corresponding to the first page are read from the storing memory 506a and combined from their divided state, and then decompressed in the compression/decompression section in the binary image-processing section 501; thus, the original bit map image data is developed on the page memory 502a and the image-processing for the "slanted letter" process is carried out (S5).

After completion of the image-processing for the "slanted letter" process, the revised image data is again compressed in the compression/decompression section of the binary image-processing section 501 (S6), and again divided in the division work area 506aa in the storing memory 506a (S7).

Thereafter, the respective divided and compressed image data are again stored in the storing area 506ab in the storing memory 506a (S8). At S8, a judgment is made as to whether or not the number of blocks in empty areas is sufficient in storing all the group of the divided and compressed image data; and if the judgment shows that it is insufficient, the respective divided and compressed image data are stored in the respective blocks where the original compressed image data prior to the "slanted letter" image process were stored in a dispersed manner.

Here, in the case when image data corresponding to a plurality of pages is stored in the storing memory 506a, the processes of S4 through S8 are repeatedly carried out on image data of all the pages.

With this arrangement, in the case when the compressed image data after having been subjected to the image-processing is again stored in the storing memory 506a in a dispersed manner, even if the number of empty blocks in the storing area 506ab of the storing memory 506a is insufficient, the blocks where the original compressed image data prior to the image-processing were stored in a dispersed manner can be utilized so as to store the group of the divided and compressed image data after the image-processing can be stored in the storing memory 506a; thus, it is possible to effectively avoid the occurrence of an interruption of the image-processing due to insufficient empty blocks in the storing memory 506a, and consequently to complete the image-processing properly.

Referring to FIGS. 7 through 10, the following description will discuss the re-storing process at S8 in the flow chart of FIG. 6(a).

The central processing unit 401 is provided with a block managing table 701 shown in FIG. 7, and manages the empty status of the storing area 506ab in the storing memory 506a by using the block managing table 701. In the block managing table 701, the block No. of the storing area 506ab in the storing area 506a and the status of the corresponding block as to emptiness are stored as a pair.

Figure 8:
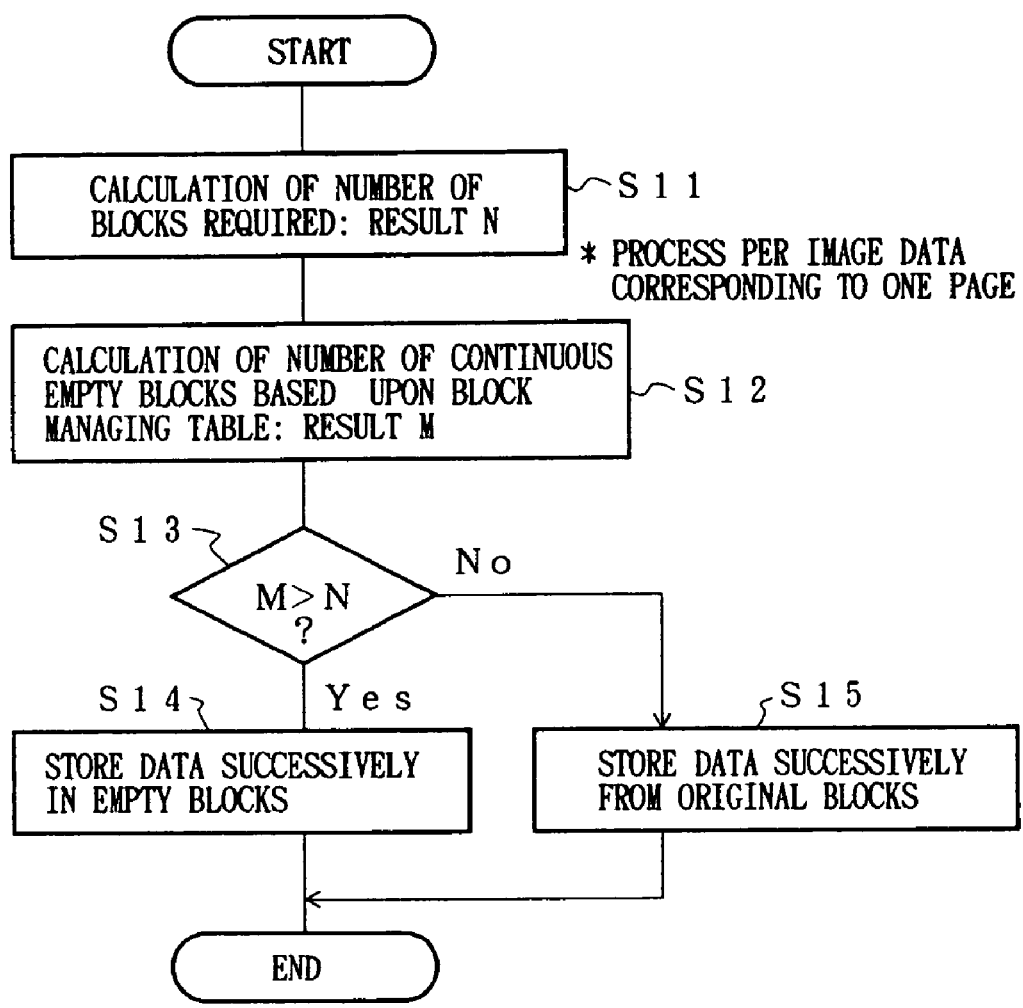
FIG. 8 is a flow chart that shows a sequence of re-storing process in S8 of FIG. 6(*a*) in the case of the application of the block management table shown in FIG. 7.

At the time of the re-storing process, as shown in the flow chart of FIG. 8, the central processing unit 401 calculates the number (N) of blocks required in re-storing the compressed image data after the image-processing (S11), also calculates the number of blocks of empty areas (number of empty blocks) M(S12), and compares the results of the calculations N and M at S11 and S12 by using a judgment section (judgment means) (S13), and if the number M of empty blocks is greater than the number N of blocks required, the compressed image data after the image-processing is preferentially stored in the empty blocks (S14).

In other words, based upon the judgment of the judgment section, the central processing unit 401 (image-processing control section) stores the image data after the image-processing (processed image-data) in the storing memory 506a (storing section).

In contrast, if the number M of empty blocks is smaller than the number N of blocks required, it stores the compressed image data after the image-processing in the respective blocks where the image data were originally stored (S15).

In other words, if the judgment section shows that empty storing areas are insufficient, the central processing unit 401 stores the image data after the image processing by utilizing the storing areas where the image data (divided and compressed image data prior to the image-processing) used to be stored.

With this arrangement, it is possible to effectively avoid the occurrence of an interruption in the image-processing due to insufficient empty areas of the storing area 506ab in the storing memory 506a, and consequently to efficiently deal with even a re-try of the image-processing up to the limit of insufficiency in the empty areas in the storing areas 506ab.

Moreover, in this case, by managing the empty blocks utilizing the block managing table 702 including information indicating the continuity of blocks as shown in FIG. 9, it is possible to preferentially use those continuous empty blocks in the storing area 506ab.

Figure 10:
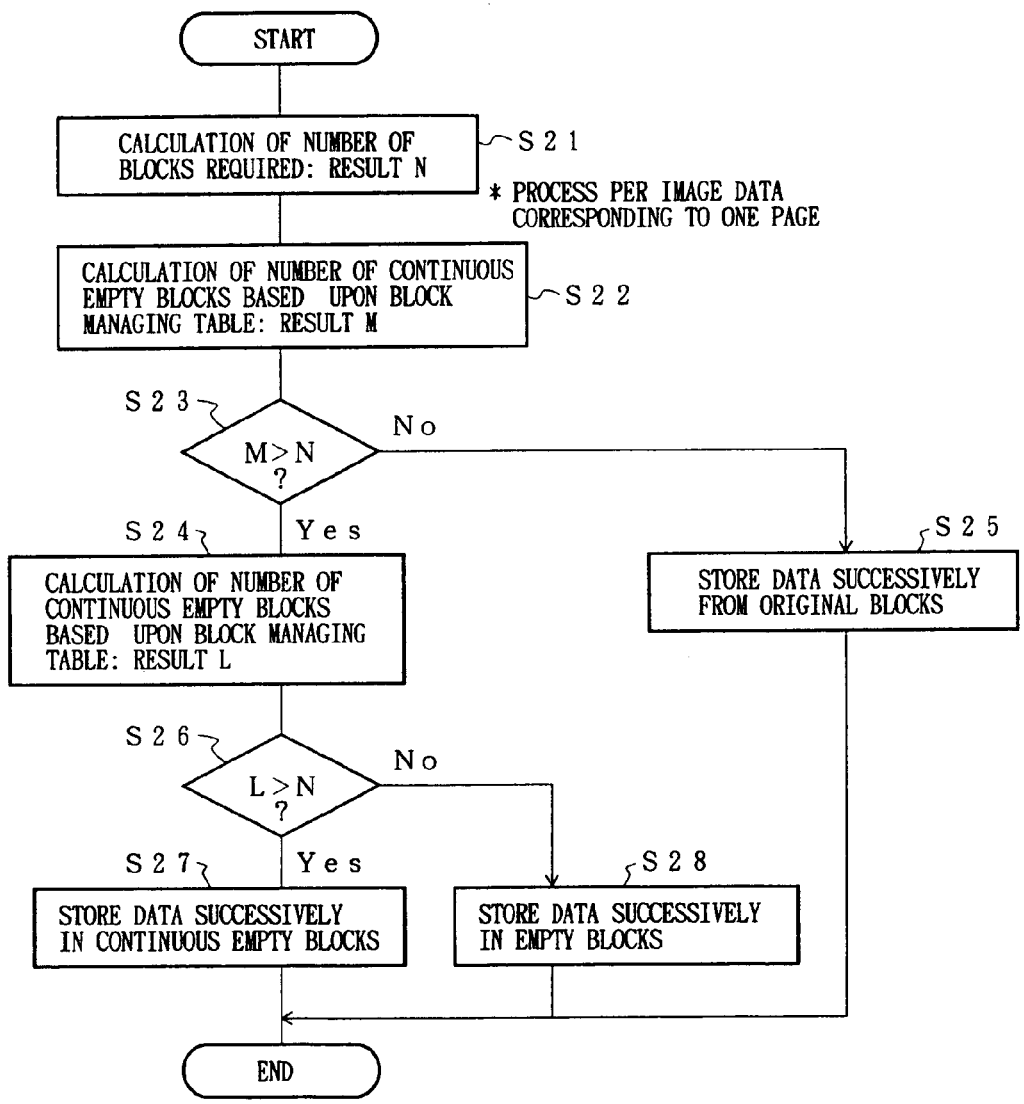
FIG. 10 is a flow chart that shows a sequence of re-storing process in S8 of FIG. 6(*a*) in the case of the application of the block management table shown in FIG. 9.

FIG. 10 shows the re-storing process of S8 in the flow chart shown in FIG. 6(a) in the case of the application of a block managing table 702 in FIG. 9.

At the time of the re-storing process, the central processing unit 401 calculates the number of blocks required in re-storing the compressed image data after the image-processing (S21), also calculates the number of blocks of empty areas (number of empty blocks) M(S22), and compares the results of the calculations N and M at S21 and S22 by using a judgment section (judgment means)(S23), and if the number M of empty blocks is smaller than the number N of blocks required, the compressed image data after the image-processing is stored in the respective blocks where the image data were originally stored (S25).

In contrast, if the number M of empty blocks is greater than the number N of blocks required, it successively calculates the number L of continuous empty blocks (S24), and compares the results of the calculations N and L at S21 and S24 (S26), and if the number L of continuous empty blocks is greater than the number N of blocks required, it preferentially stores the compressed image data after the image-processing in the continuous empty blocks (S27), and if the number L of continuous empty blocks is smaller than the number N of blocks required, it stores the compressed image data after the image-processing successively in the empty blocks independent of the continuity of empty blocks (S28).

In other words, if the judgment section makes a judgment that the empty storing areas are sufficient in storing the processed image data in the storing section, the image-processing control section stores the processed image data by preferentially using the empty storing areas consisting of the continuous blocks.

With this arrangement, upon dividing and re-storing the compressed image data after the image-processing, it is possible to prevent the group of the divided and compressed image data from being stored in a dispersed manner over the storing area 506ab, and also to allow the blocks for storing the group of the divided and compressed image data to have continuous addresses, thereby increasing the processing speed at the time of outputting images.

Next, referring to FIG. 1, and FIGS. 11 through 15, the following description will discuss a case in which image data of four pages is subjected to a "center binding process", which is one example of editing processes.

FIG. 11 illustrates the "center binding process", which is classified into a right binding process and a left binding process. In the Figure, the right binding process is shown on the left side, and the left binding process is shown on the right side.

Figure 12:
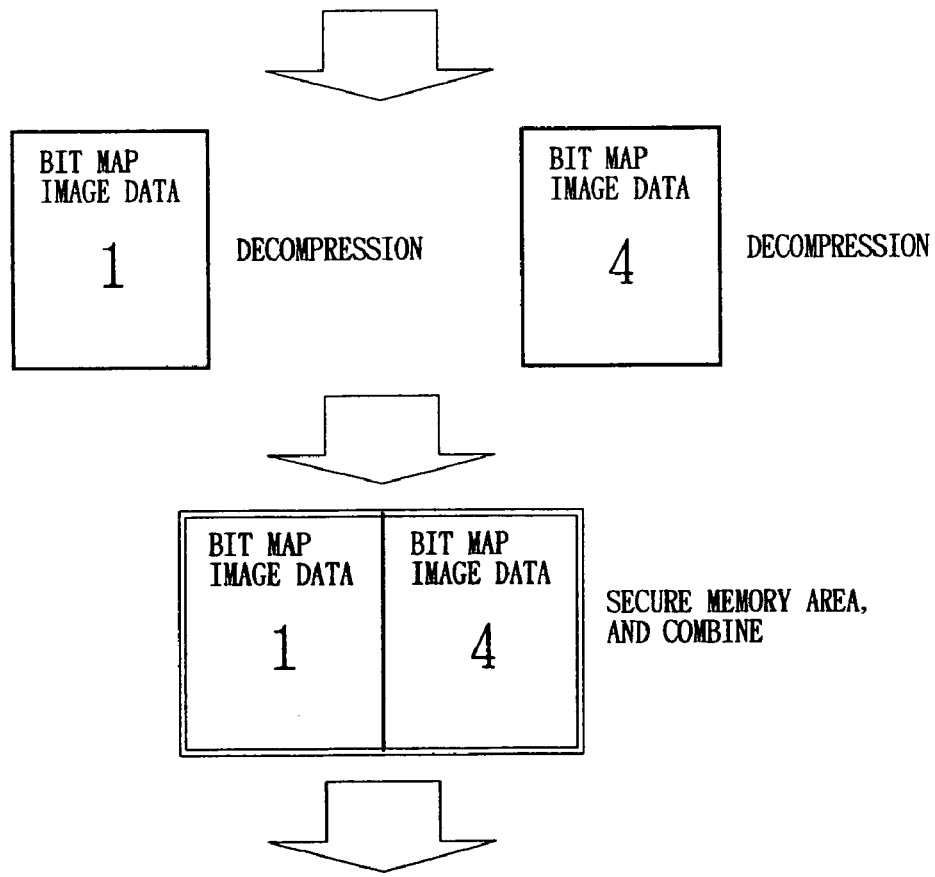
FIG. 12 is an explanatory drawing that shows a sequence of processes in which page 1 and page 4 have been combined in "the editing process for center binding (right binding)."

First, referring to FIGS. 12 through 14, an explanation will be given of a sequence of processes for carrying out the "center binding (right binding) process". FIG. 12 illustrates processes in which the first page and the fourth page have been combined in the "center binding (right binding) process".

As illustrated in FIG. 12, image data corresponding to first to fourth pages of the documents are read by the scanner section 31 page by page, and in each of the reading processes, the image data is binarized in the binary image-processing section 501 so that the resulting bit map image data is temporarily stored in the page memory 502a; thus, the stored image data is successively compressed by the compression/decompression section of the binary image-processing section 501. Then, the compressed image data is temporarily stored in the division work area 506aa of the storing memory 506a where it is divided, and the pieces of the data are arranged in a divided manner in the storing area 506ab within the storing memory 506a while empty areas are being searched for on a basis of predetermined blocks.

Figure 13:
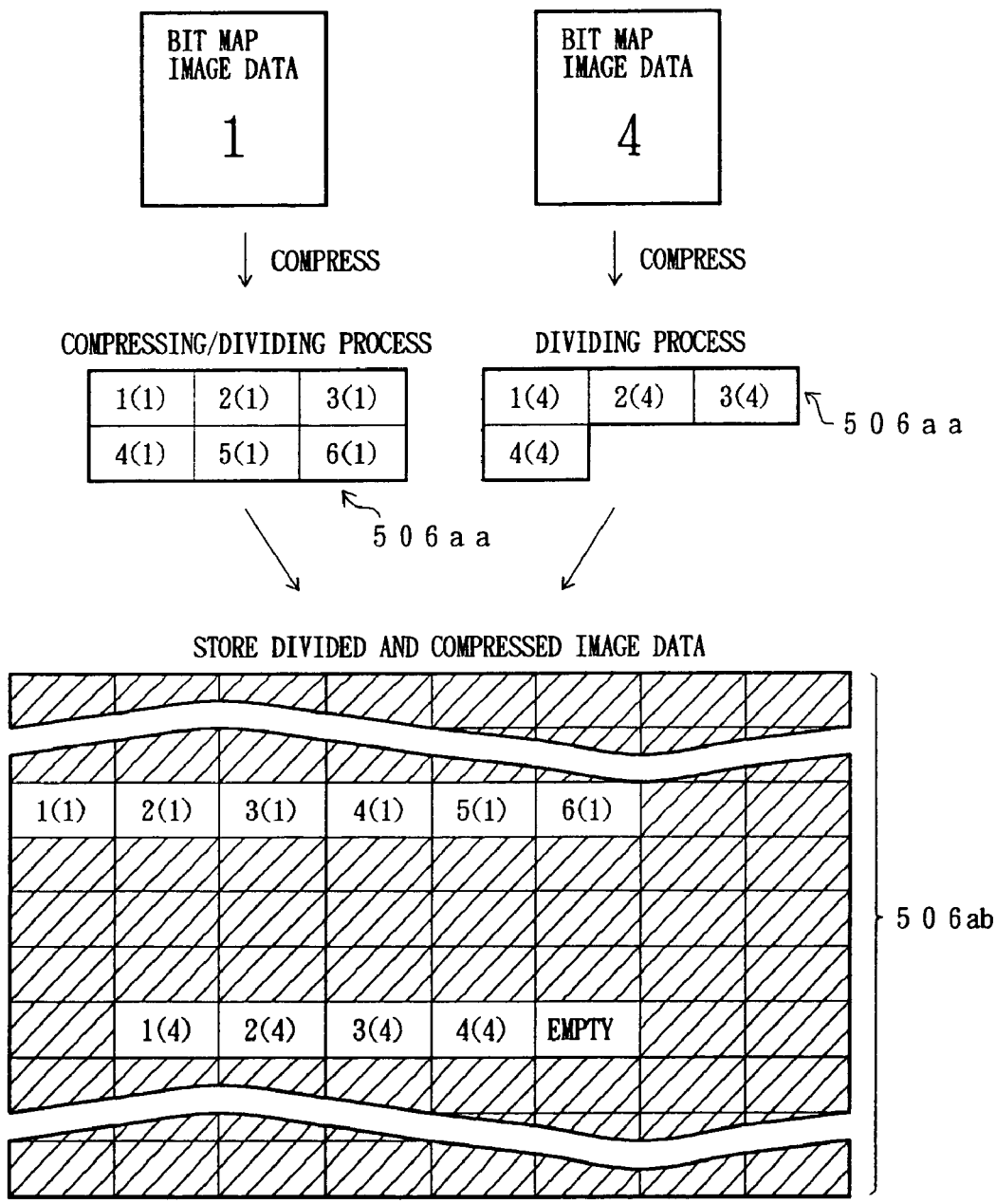
FIG. 13 is an explanatory drawing that shows a state in which respective data of page 1 and page 4 are compressed, divided and then stored in a storing memory in the center binding process.

FIG. 13 shows a state in which the image data corresponding to the first and fourth pages are compressed and stored in the storing area 506ab of the storing memory 506a in a divided manner.

Next, as illustrated in FIG. 12, the divided and compressed image data representative of the leading first page and the last fourth page are taken out from the respective blocks of the storing area 506ab of the storing memory 506a, and the groups of the divided and compressed image data representative of the first page and the fourth page thus taken out are joined from their divided state, and respectively decompressed in the page memory 502a so as to be restored to respective bit map image data; thus, the respective images are combined in an editing memory area corresponding to two pages.

Thereafter, in order to again store the combined image in the storing area 506ab of the storing memory 506a, the combined image data (bit map image data) in the editing memory area is compressed in the compression/decompression section of the binary image processing section 501, and divided in the division work area 506aa within the storing memory 506a.

In this case, if there are not any empty blocks used for the new storage in the storing area 506ab within the storing memory 506a, the divided and compressed image data after the image-processing are stored in the respective blocks where the image data were originally stored, as explained earlier.

Figure 14:
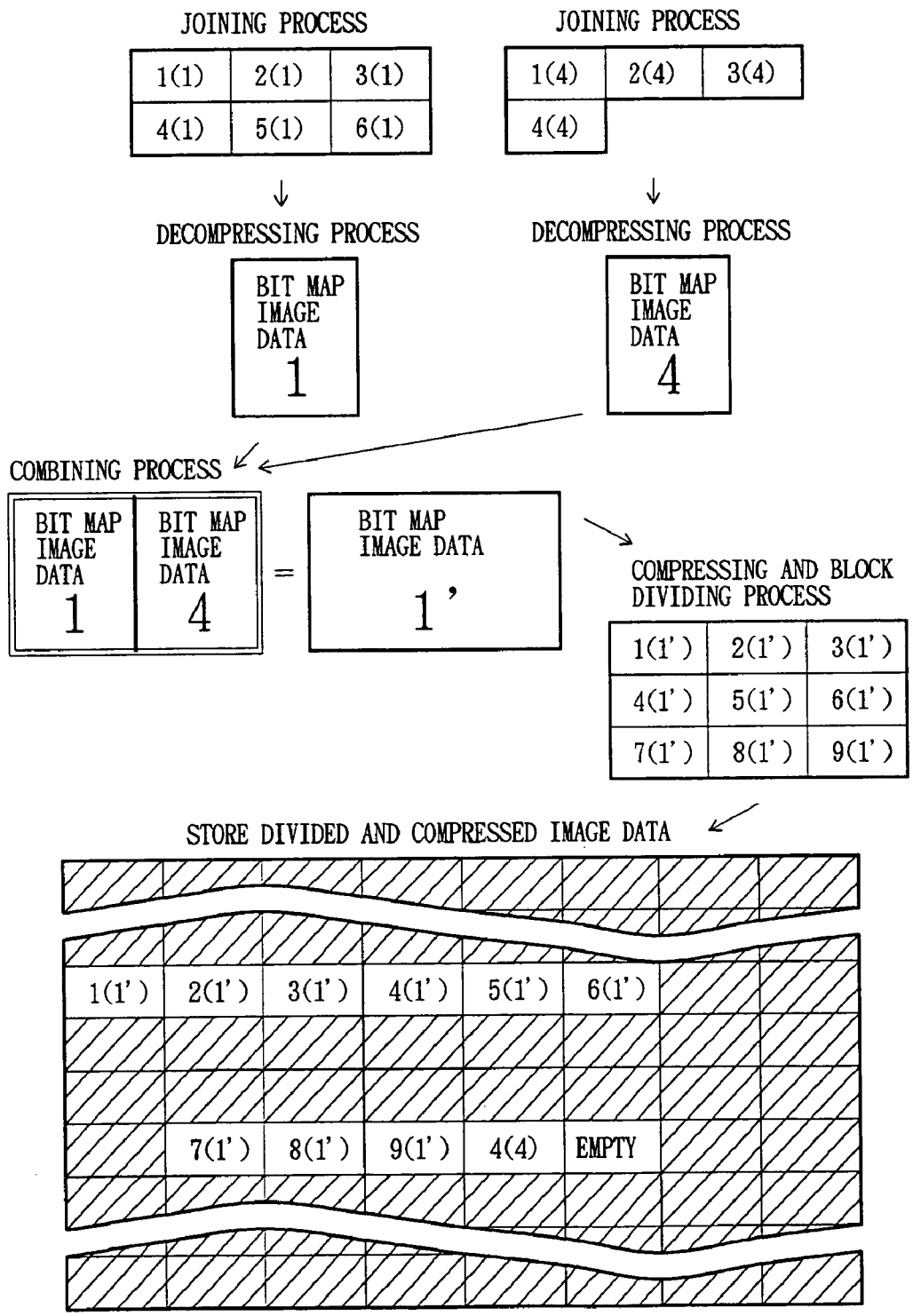
FIG. 14 is an explanatory drawing that shows a state in which respective groups of divided and compressed image data of page 1 and page 4 are read from the storing memory, subjected to image processes, and then re-stored in the storing memory in "the editing process for center binding (right binding)."

FIG. 14 shows a state in which image data representative of a new first page (1'), which has been formed by combining the pieces of the image data representative of the first page and the fourth page, is compressed and stored in the respective original blocks in the storing area 506ab of the storing memory 506a.

With respect to image data of the second page and the third page, the groups of the divided and compressed image data after the editing process are stored in the respective blocks where the image data were originally stored, in the same manner.

Next, an explanation will be given of a method for improving the processing speed in the case when an editing process including an "image combining" process such as a "center binding" process is carried out.

Although the above-mentioned method requires a memory used for decompressing the image data representative of the first page and the fourth page in the page memory 502a and for restoring the respective bit map images as well as a new editing memory area corresponding to two pages, it can eliminate the need for an excessive work memory for the editing process by using the sequence of processes shown in FIG. 15, and can also improve the processing speed.

In the case when the "center binding" editing process is preliminarily set, image data representative of odd pages (the first page, the third page) read by the scanner section 31 is binarized in the binary image-processing section 501, and temporarily stored in the page memory 502a; and, in this case, the central processing unit 401, which functions as the pre-processing means (image-processing control section), adds white data corresponding to one more page to the image data corresponding to one page in its pre-processing.

Thereafter, the image data is compressed by the compression/decompression section of the binary image-processing section 501, and temporarily stored in the division work area 506aa within the storing memory 506a where it is divided. Thereafter, the pieces of the data are arranged in a divided manner in the storing area 506ab within the storing memory 506a while empty areas are being searched for on a basis of predetermined blocks so that the compressed image data consisting of the image data corresponding to one page and white data corresponding to one page is stored. Here, since the data corresponding to one page is white data, the data, when compressed, hardly makes any difference as compared with the capacity of the compressed image data of the read image, and hardly gives any great burden on the storing memory 506a.

In contrast, image data representative of even pages (the second page, the fourth page) read by the scanner section 31 is binarized in the binary image-processing section 501, and temporarily stored in the page memory 502a; however, with respect to the even pages, different from the odd pages, no additional white page is given thereto.

The bit map image data stored in the page memory 502a, as it is, is compressed by the compression/decompression section of the binary image-processing section 501, and temporarily stored in the division work area 506aa within the storing memory 506a where it is divided. Thereafter, the pieces of the data are arranged in a divided manner in the storing area 506ab within the storing memory 506a while empty areas are being searched for on a basis of predetermined blocks so that the compressed image data corresponding to one page is stored.

Next, in order to carry out the "center binding" editing process, the compressed image data of the leading first page (odd page) is decompressed in the page memory 502a so as to restore the bit map image data consisting of the image data corresponding to one page and white page corresponding to one page.

Successively, the compressed image data of the fourth page (even page) is decompressed in the page memory 502a, and combined in a memory area corresponding to two pages. Thereafter, this is re-stored in the storing memory 506a in the same manner as described above.

In the above-mentioned arrangement, in the case of an image processing including a combining process, in the stage prior to the compressing process, an image of a page forming the main subject of the combining process (main image data), that is, an odd page in this case, is added by white data (blank section) corresponding to one page so as to allow for an area to which an even page (sub-image data) is inserted; therefore, it is possible to reduce the amount of memory in the page memory 502a, and consequently to provide a high-speed combining process by using a less amount of memory. Moreover, since the amount of memory corresponding to the additional white data of one page can be highly compressed, it is possible to avoid the problem of an increased memory consumption in the storing memory 506a.

Additionally, the explanation has exemplified the case in which an even page is inserted to an odd page; however, another arrangement may of course be adopted in which an odd page is inserted to an even page provided with additional white data.

Moreover, not limited to the "center binding" editing process, the same effects will be obtained when the arrangement of the present embodiment is applied to another imaging process including a combining process, such as an "N in 1 editing" process for collecting a plurality of pages of documents into one page.

The image-processing apparatus of the present invention, which is provided with an image-processing means for carrying out an image processing on image data, which compresses and divides the image data so as to be stored in a storing means in a divided manner, and which combines the group of the divided and compressed image data thus stored, and decompresses and restores them so as to be outputted, may comprise a storing area managing means for managing a storing area of the storing means, the storing area managing means being designed so that, when, after the group of the divided and compressed image data, which were divided and temporarily stored in the storing means, have been restored and subjected to the image processing, the resulting data is again compressed and divided so as to be stored in the storing means, a storing area used by the group of the divided and compressed image data prior to the image processing is also used.

As described above, in the arrangement in which the group of divided and compressed image data stored in the storing means is maintained until the specified image processing has been completely finished, in case of re-try due to an unexpected trouble, etc., if empty storing areas required for storing compressed and divided image data after the image processing are insufficient, or if no empty storing area exists, the image processing might be interrupted in the mid-course.

In contrast, in the above-mentioned arrangement, the storing area managing means allows the group of divided and compressed image data after the processing to be stored also in the original storing areas in the storing means; therefore, even if empty storing areas are insufficient, or if no empty storing area exists, the group of divided and compressed image data after the image processing can be stored in the storing means by utilizing the original storing areas. Consequently, it is possible to effectively avoid the occurrence of an interruption in the image-processing due to insufficient empty areas.

The resulting effect is that, in an image-processing apparatus of a type equipped with a storing means which compresses and divides image data, and then stores the resulting image data, it is possible to carry out the image processing more efficiently.

The image-processing apparatus of the present invention may be provided with a judgment means which makes a judgment as to whether or not an empty storing area in the storing section is sufficient in re-storing the group of divided and compressed image data after the image processing, and the storing area managing means may be arranged so that if the judgment means shows that it is insufficient, it utilizes the storing areas used by the divided and compressed image data prior to the image processing as a storing destination for the group of the divided and compressed image data after the image processing.

As described earlier, it is preferable to maintain the group of divided and compressed image data stored in the storing means until the image processing has been completely finished in case of a re-try due to an unexpected trouble, etc.

Therefore, in this arrangement, the judgment means is allowed to make a judgment as to whether or not an empty storing area in the storing section is sufficient in re-storing the group of divided and compressed image data after the image processing, and only when the judgment means shows that it is insufficient, the storing area managing means utilizes the original storing areas.

With this arrangement, it is possible to effectively avoid the occurrence of an interruption in the image-processing due to insufficient empty areas of the storing area for the group of divided and compressed image data after the image processing, and consequently to efficiently deal with even a re-try of the image-processing up to the limit of insufficiency in the empty areas.

In other words, in the image-processing apparatus of the present invention which carries out an image processing by decompressing and restoring divided and compressed image data, if the capacity of empty areas becomes insufficient upon storing compressed data after the image processing, the original storing areas are utilized to store the data; therefore, this arrangement is beneficial in that no high capacity memory is required and in that it is possible to avoid problems due to an insufficient capacity of empty areas.

In the image-processing apparatus of the present invention, the storing area managing means may be arranged so that upon storing the group of divided and compressed image data in empty storing areas after the image processing, the data storage is preferentially made in a portion having continuous sections, each being able to store one divided portion of the compressed image data.

Upon re-storing the group of divided and compressed image data after the image processing, this arrangement makes it possible to prevent the divided and compressed image data from being stored in a dispersed manner over the entire storing areas, and consequently to improve the processing speed at the time of image outputting by providing continuous addresses.

The image-processing apparatus of the present invention, which has an image-processing means for carrying out an image processing on image data, which compresses and divides the image data so as to be stored in a storing means in a divided manner, and which combines the group of the divided and compressed image data thus stored, and decompresses and restores them so as to be outputted, may be provided with: a pre-processing means which, upon having an instruction for an image-processing including an image combining process such as a center binding edition and an edition for collecting images corresponding to a plurality of pages into one page, carries out a pre-processing for allowing image data of an image forming a subject for the combining process to preliminarily possess a blank section to which the image to be combined is inserted, prior to the inputted image data is compressed, divided and stored in the storing means.

In the case when a group of divided and compressed image data, which have been temporarily stored in the storing means, are read out and subjected to an image processing including an image combining process such as a center binding edition and an edition for collecting images corresponding to a plurality of pages into one page, the group of divided and compressed image data corresponding to respective pages to be combined are joined and decompressed on a working memory so as to be brought to an operable state for the image processing, and are then combined.

Therefore, in the case of collecting images corresponding to two pages into one page, a working memory corresponding to a total of four pages is required for reading the respective pages and for combining the images.

In contrast, in the above-mentioned arrangement, prior to compressing and dividing the image data and to storing the resulting data in the storing means, the pre-processing means allows the image forming a subject for the combining process to preliminarily possess a blank section to which the image to be combined is inserted. Consequently, although a working memory corresponding to two pages is required so as to read the image forming the subject, the blank section corresponding to one page has already been maintained in the image forming the subject thus read; therefore, the combining process can be carried out by reading the image to be combined into the blank section.

With this arrangement, in the process for collecting images corresponding to two pages into one page, it is possible to carry out the process by using a working memory corresponding to a total of two pages, and also to simplify and shorten the combining process. Here, since image data in the blank section can be highly compressed, it is possible to reduce the consumption of the areas in the storing means, and also to eliminate the necessity of consuming greater storing areas in the storing means so as to minimize the working memory.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image-processing apparatus comprising:
a storing section having a storing area for storing image data that has been compressed and divided;
an image-processing control section that is configured and arranged so as to compresses and divide the image data and to store the compressed and divided image data in the storing section ("stored image data"), so as to combine and decompress the stored image data, so as to perform image processing on the combined and decompressed stored image data, so as to compress and divide the processed image data and to store the compressed and divided processed image data in the storing section;
wherein the image-processing control section includes a judgment section configured and arranged so as to make a judgment as to whether or not an empty storing area in the storing section is sufficient for storing the compressed and divided processed image data; and
wherein upon a judgment by the judgment section that the empty storing area is insufficient to store the compressed and divided processed image data, the image-processing control section controls the storage of the compressed and divided processed image data so as to allow the compressed and divided processed image data to be stored in storing areas of the storing section including the storing areas in which the stored image data was originally stored.

2. The image-processing apparatus as defined in claim 1, wherein:

the storing area is constituted by a plurality of blocks, each storing one divided portion of any image data being stored in the storing section, and
when the judgment by the judgment section shows that the empty storing area is sufficient, the image-processing control section controls the storage of the compressed and divided processed image data so as to preferentially use an empty storing area consisting of continuous blocks so as to store the compressed and divided processed image data.

3. The image-processing apparatus as defined in claim 2, wherein the judgment section:
identifies contiguous blocks of the empty storing area,
determines if the contiguous blocks are sufficient for storing the compressed and divided processed image data, and
upon a determination by the judgment section that the contiguous blocks are sufficient to store the compressed and divided processed image data, the image-processing control section controls the storage of the compressed and divided processed image data so as to preferentially allow the compressed and divided processed image data to be stored in the contiguous blocks.

4. The image-processing apparatus as defined in claim 1, wherein upon a judgment by the judgment section that the empty storing area is sufficient to store the compressed and divided processed image data, the image-processing control section controls the storage of the compressed and divided processed image data so the compressed and divided processed image data is stored in the empty storing area.

5. The image processing apparatus as defined in claim 1, wherein the compressed and divided processed image data is divided into predetermined block units and wherein the image-processing control section controls the storage of the compressed and divided processed image data so that the compressed and divided processed image data is transferred block unit by block unit to the storing section.

6. An image-processing apparatus comprising:
a storing section having a storing area for storing image data that has been compressed and divided; and
an image-processing control section being configured and arranged so as to combine and decompress image data (stored image data) being stored in the storing section, so as to carry out an image processing on the combined and decompressed image data, so as to compress and divide the processed image data and to store the combined and divided processed image data in the storing section,
wherein the image-processing control section includes a judgment section which makes a judgment as to whether or not an empty storing area in the storing section is sufficient for storing the compressed and divided processed image data, wherein based upon the judgment by the judgment section, the image-processing control section controls the storage of the compressed and divided processed image data so as to allow the compressed and divided processed image data to be stored in storing areas in which the stored image data was originally stored.

7. The image-processing apparatus as defined in claim 6, wherein,
when the judgment by the judgment section shows that the empty storing area is insufficient to store the compressed and divided processed image data, the image-processing control section controls the storage of the compressed and divided processed image data so as to allow the compressed and divided processed image data to be stored in the storing areas in which the stored image data was originally stored.

8. The image-processing apparatus as defined in claim 6, wherein:
the storing area is constituted by a plurality of blocks, each storing one divided portion of any image data being stored in the storing section, and
when the judgment by the judgment section shows that the empty storing area is sufficient, the image-processing control section controls the storage of the compressed and divided processed image data so as to preferentially use an empty storing area consisting of continuous blocks so as to store the compressed and divided processed image data.

9. The image-processing apparatus as defined in claim 8, wherein the judgment section:
identifies contiguous blocks of the empty storing area,
determines if the contiguous blocks are sufficient for storing the compressed and divided processed image data, and
upon a determination by the judgment section that the contiguous blocks are sufficient to store the compressed and divided processed image data, the image-processing control section controls the storage of the compressed and divided processed image data so as to preferentially allow the compressed and divided processed image data to be stored in the contiguous blocks.

10. The image-processing apparatus as defined in claim 7, wherein upon a judgment by the judgment section that the empty storing area is sufficient to store the compressed and divided processed image data, the image-processing control section controls the storage of the compressed and divided processed image data so the compressed and divided processed image data is stored in the empty storing area.

11. The image processing apparatus as defined in claim 7, wherein the compressed and divided processed image data is divided into predetermined block units and wherein the image-processing control section controls the storage of the compressed and divided processed image data so that the compressed and divided processed image data is transferred block unit by block unit to the storing section.

12. An image-processing apparatus, which comprises an image-processing means for carrying out an image processing on image data, which image-processing apparatus compresses and divides the processed image data so as to be stored in a storing means in a divided manner, and which combines the group of the stored, divided and compressed processed image data, and decompresses and restores the stored, divided and compressed processed image data so as to be outputted, said image-processing apparatus comprising:
a storing area managing means for managing a storing area of the storing means, the storing area managing means being designed so that, when, after a egroup of divided and compressed unprocessed image data, which were divided and temporarily stored in the storing means, have been restored and subjected to the image processing, the processed image data is compressed and divided so as to be stored in the storing means;
a judgment means for making a judgment as to whether or not one or more empty storing areas in the storing means are sufficient for storing the group of divided and compressed processed image data after the image processing; and
wherein, when the judgment means shows that the empty storing areas are insufficient for storing the group of divided and compressed processed image data, the storing area managing means is designed so as to utilize a storing area used by the group of the divided and compressed unprocessed image data so as to store the group of the divided and compressed processed image data.

13. The image-processing apparatus as defined in claim 12, wherein, upon showing that the one or more empty storing areas are sufficient for storing the group of the divided and compressed processed image data in the empty storing areas, the storing area managing means preferentially carries out a storing process in a portion having continuous sections each corresponding to one divisional portion of the compressed processed image data.

* * * * *